United States Patent [19]

Roberts

[11] Patent Number: 4,488,031
[45] Date of Patent: Dec. 11, 1984

[54] ROTARY ELECTRODE DISC APPARATUS

[75] Inventor: Peter R. Roberts, Groton, Mass.

[73] Assignee: Nuclear Metals, Inc., Concord, Mass.

[21] Appl. No.: 484,444

[22] Filed: Apr. 13, 1983

[51] Int. Cl.³ .......................... B22F 9/10; B22F 9/14; B23P 1/06

[52] U.S. Cl. .................................. 219/69 R; 264/8; 264/10; 425/8

[58] Field of Search .................. 219/69 R; 264/8, 10; 425/6, 8

[56] References Cited

U.S. PATENT DOCUMENTS

| | | | |
|---|---|---|---|
| 2,897,539 | 8/1959 | McMillan | 264/10 |
| 3,021,562 | 2/1962 | Chisholm et al. | 264/10 |
| 3,099,041 | 7/1963 | Kaufmann | 425/8 |
| 3,963,812 | 6/1976 | Schlienger | 264/10 |
| 4,036,568 | 7/1977 | Morlet et al. | 264/10 |
| 4,238,427 | 12/1980 | Chisholm | 264/10 |
| 4,374,075 | 2/1983 | Yolton et al. | 264/10 |

*Primary Examiner*—Roy N. Envall, Jr.
*Assistant Examiner*—Geoffery S. Evans
*Attorney, Agent, or Firm*—Joseph S. Iandiorio

[57] ABSTRACT

A rotary electrode apparatus for producing metal powders including a chamber for maintaining a controlled atmosphere. A first electrode is mounted in the chamber and a second consumable disc electrode is mounted in the chamber confronting the first electrode. An electric arc is struck between the first electrode and a circumferential portion of the disc electrode in order to melt the circumferential portion. The disc electrode is rotated at sufficient speed to enable melting of the circumferential portion of the disc and spinning off of melted portions of the disk.

8 Claims, 10 Drawing Figures

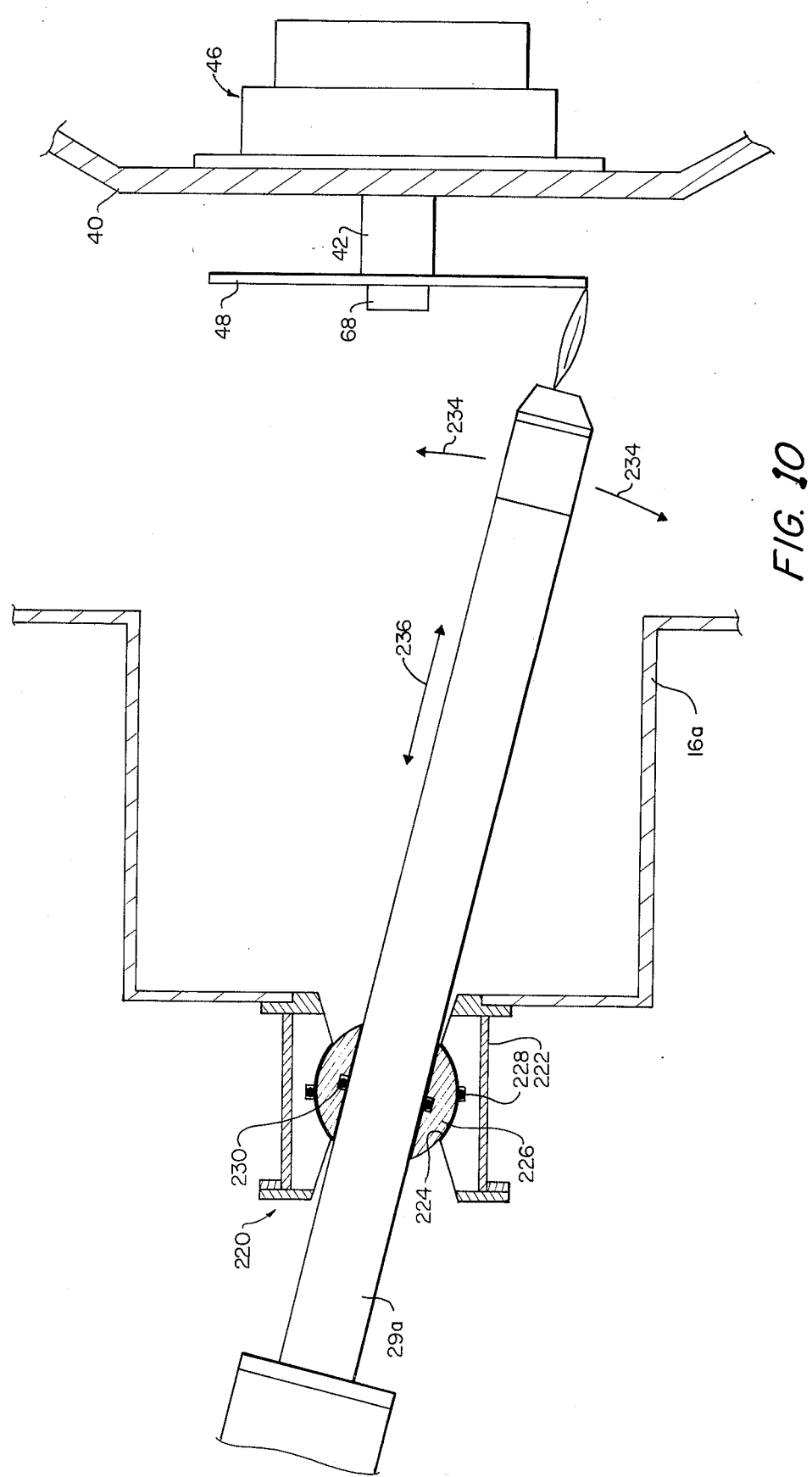

ROTARY ELECTRODE DISC APPARATUS

FIELD OF INVENTION

The invention relates to a rotary disc electrode apparatus for producing powder from solid stock, and more particularly to such apparatus capable of producing generally spherical, high-purity metallic powder in commercial quantities.

BACKGROUND OF INVENTION

Metallic and other powders are in wide use in the metalworking industry in forming and shaping processes and in forming composite materials by sintering a mixture of powders. Often these applications require powders which are preferably spherical and of small, uniform size, e.g. 50–500 microns. Conventionally, powders were made by chemical reduction of metallic salts, comminution of solid stock, gas jet disruption of a stream of liquid metal (gas atomisation) and water jet disruption of a stream of liquid metal (water atomisation), and by other mechanical means. For certain critical applications, these techniques rendered poor results in terms of purity, size, shape and uniformity. A more satisfactory technique is the rotating electrode process taught in U.S. Pat. Nos. 3,099,041 and 3,802,816. Typically in this process an atmospherically controlled chamber is provided within which is included a stationary electrode and an elongate, rotatable rod of material to be processed which acts as the second electrode. A motor rotates the rod as it is longitudinally advanced toward the first electrode. An arc struck between the electrodes consumes the rod material and rotation of the rod casts the melted material off by centrifugal force so that it forms a powder. The bar is consumed until only an unusable stub remains, whereupon a new bar may be inserted.

One problem that is associated with the previously described device is the tendency of the free end of the bar or consumable electrode to wobble as a result of the centrifugal force acting on it due to its own rotation. Furthermore, the bars are typically sixty inches long and leave a ten-inch stub, which effects an efficiency of only eighty-three and a third percent. A higher conversion rate is clearly desirable.

These bars are available in reasonably pure form in generally two to three inch diameters. However, recently the demand has been for ever higher purity of the powders. Unfortunately, higher purity bar stock is not readily available in the two or three inch diameter size but in much larger sizes, e.g. eight to twenty-five inch diameters, which are difficult to handle and process.

SUMMARY OF INVENTION

It is therefore an object of this invention to provide an improved apparatus for the rotary electrode process of powder production.

It is a further object of this invention to provide such apparatus which can provide higher purity powder from commercially available stock.

It is a further object of this invention to provide such apparatus which eliminates the problems associated with the centrifugal forces applied to the free end of conventional bar stock.

It is a further object of this invention to provide such apparatus which provides more efficient production of powder from solid stock.

It is a further object of this invention to provide such apparatus which can be used in conventional rotary electrode process machines with minimal alteration.

It is a further object of this invention to provide such apparatus which produces higher purity, generally spherical powder from commercially available high purity stock.

It is a further object of this invention to provide such apparatus which reduces the need for extensive preparation and handling of solid stock prior to processing.

The invention results from the realization that an improved, highly efficient apparatus for rotary electrode processing of larger diameter, higher purity, commercially available stock into powder can be effected using a rotatable disc-shaped consumable electrode of the stock and moving the arc between the electrodes inwardly on the rotating disc as it is consumed, while proportionately increasing the speed of rotation to maintain a constant peripheral speed of the edge of the diminishing disc.

The invention features a rotary electrode apparatus for producing metal powders including a chamber for maintaining a controlled atmosphere therein. There are first means for mounting a first electrode in the chamber and second means for mounting a second consumable disc electrode in the chamber confronting the first electrode. There are means for striking an electric arc between the first electrode and a circumferential portion of the disc electrode in order to melt the circumferential portion. Means are provided for rotating the disc electrode at sufficient speed to enable melting of the circumferential portion of the disc and casting off of melted circumferential portions therefrom.

In a preferred embodiment the first means for mounting includes means for moving the arc inwardly on the disc electrode as successive circumferences of the disc electrode are consumed. The means for moving may include means for varying the angle of the first electrode relative to the consumable disc electrode. The means for rotating may include means for varying the speed of rotation of the disc electrode inversely with respect to the diameter thereof. The second means for mounting may include a rotatable mandrel and means for attaching a consumable disc electrode to the mandrel. The means for rotating may include a motor and in such embodiments the means for varying the speed of rotation preferably includes means for controlling speed of the motor.

DISCLOSURE OF PREFERRED EMBODIMENT

Other objects, features and advantages will occur from the following description of a preferred embodiment and the accompanying drawings, in which:

FIG. 10 is a view partially in cross section of an alternative construction for mounting the first electrode and moving the arc relative to the disc.

Figure 1:
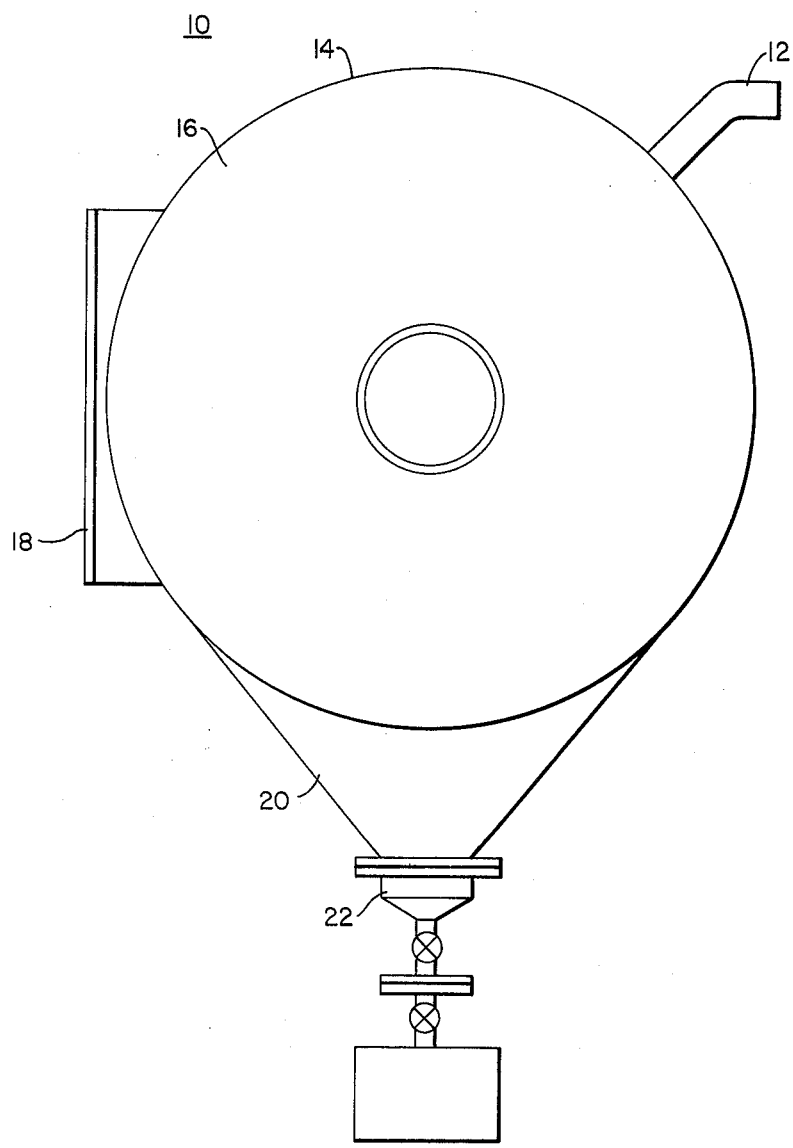
FIG. 1 is a front view of a chamber for housing the rotary electrode apparatus of this invention and the receptacle for receiving spherical metal powders produced thereby.

The invention is accomplished with a rotary electrode apparatus having a chamber in which the rotating disc electrode is mounted. A controlled atmosphere for encouraging and sustaining the arc burning process is maintained in the chamber. Typically the interior of the chamber is vacuum evacuated and backfilled with an inert gas, such as helium, to a desired pressure. The inside surface of the chamber of typically stainless steel and double-wall construction is provided to enable water cooling of the chamber. A Pyrex or quartz window is provided to permit viewing of the process.

A first electrode (cathode) is mounted in the chamber to confront the circumferential edge of the disc electrode (anode). The first electrode may be composed of tungsten or thoriated tungsten or other electron emissive metal. It will typically be housed within a copper nozzle having a port proximate the distal end of the first electrode through which the arc is emitted. Means are provided for striking an arc between the first electrode and a circumferential portion of the disc electrode. The latter is composed of solid metal stock such as Ti 6Al 4V, stainless steel, nickel base superalloy or other metal alloy. High purity remelt ingots of nickel base superalloys are typically produced in diameters of from 8 to 25 inches. Electrode discs may be readily produced from such high quality ingots. Much less effort is involved than is required to reduce such superalloy ingots to the small diameter (typically 2½ inches) rods used in the prior art rotary electrode apparatus. The arc effects burning or melting of the metal stock.

The disc electrode is preferably mounted on a mandrel which is rotated by a motor external to the chamber. The mandrel may itself be composed of solid stock connected to the end of a shaft driven by the motor. Typically a variable-speed D.C. motor having a large pulley driving a flat belt is utilized. The belt in turn drives a smaller crowned pulley of the rotor shaft. Pulley diameter ratio may be approximately 7:1 so that high rotational speeds (e.g. up to approximately 18,000 RPM) are obtained for rotating the disc electrode.

As the disc electrode is rotated successive circumferential portions are melted. The motor rotates the disc electrode at sufficient speed so that the melted circumferential portions are spun off of the electrode.

A constant peripheral or circumferential speed is required as the diameter of the disc diminishes in order to maintain a constant centrifugal force upon melted portions being spun from the disc. In this way spherical powder particles are produced where a level of control is achieved over the particle size distribution. Accordingly, means may be provided for varying the speed of rotation of the disc inversely with respect to the diameter thereof. A feedback and control system is provided which includes a disc diameter monitor such as a monotonic photoelectric device for measuring the diameter of the disc. A speed control responds to such measurements to increase the speed of disc rotation, typically by increasing the speed of the motor, as the disc diameter diminishes.

A preferred tangential velocity is 163.62 ft/sec: that is the speed typically maintained by rotating the 2½ inch diameter by 60 inch long solid stock rod of the prior art at a constant rate of 15,000 RPM. To maintain such a surface velocity in the present invention the speed control increases the rate of disc rotation as the disc diameter decreases, as shown in the following table:

| DISC DIAMETER (inches) | RPM | SURFACE SPEED AT RIM OF DISC |
|---|---|---|
| 12 | 3,125 | 163.625 ft./sec. |
| 11 | 3,409 | 163.620 ft./sec. |
| 10 | 3,750 | 163.625 ft./sec. |
| 9 | 4,167 | 163.638 ft./sec. |
| 8 | 4,688 | 163.642 ft./sec. |
| 7 | 5,357 | 163.620 ft./sec. |
| 6 | 6,250 | 163.625 ft./sec. |
| 5 | 7,500 | 163.625 ft./sec. |
| 4 | 9,375 | 163.625 ft./sec. |
| 3 | 12,500 | 163.625 ft./sec. |

Means are also typically provided for moving the arc inwardly on the rotating disc electrode as successive circumferences thereof are consumed. A feedback and control system may be used for such purpose. Preferably the disc diameter monitor provides measurements to control devices such as translational and/or angular servomechanisms which are programmed to respond to diameter measurements and adjust the portion of the first electrode in such a manner as to move the arc inwardly on the disc electrode as that electrode is consumed. Alternatively, manual controls are provided for varying the position of the first electrode, either translationally or angularly, relative to the consumable disc electrode.

By utilizing the rotary disc electrode of this invention, conversion efficiency is greatly enhanced. Burning the 2½ inch diameter by 60 inch long bar utilized by the prior art typically leaves a ten-inch stub unconsumed, resulting in a conversion rate of 50/60 or 83.33%. When a disc (radius $r_1$) according to this invention is burned down to a stub (radius $r_2$) the proportion consumed is given by the ratio $$\frac{\pi r_1^2 - \pi r_2^2}{\pi r_2^2}.$$

Burning a 12 inch diameter disc down to a 3-inch diameter stub thus yields a conversion efficiency of 93.75%, which is a substantial improvement over the prior art. By utilizing discs of larger diameter, even higher efficiency may be achieved.

There is shown in FIG. 1 a rotary electrode apparatus 10 according to this invention. A manifold 12 communicates with the interior of a chamber 14 so that a controlled atmosphere may be provided therein. A door 16 is hingeably mounted by hinge 18 at an open end of the chamber. Door 16 is closed during operation of apparatus 10 and may be opened between operations to gain access to the interior of the chamber for cleaning, inspection and recharging with essential materials. A funnel 20 in the bottom of chamber 14 converges into a receptacle 22, which collects powder produced in chamber 14 and transfers such powder to desired storage or use locations.

Figure 2:
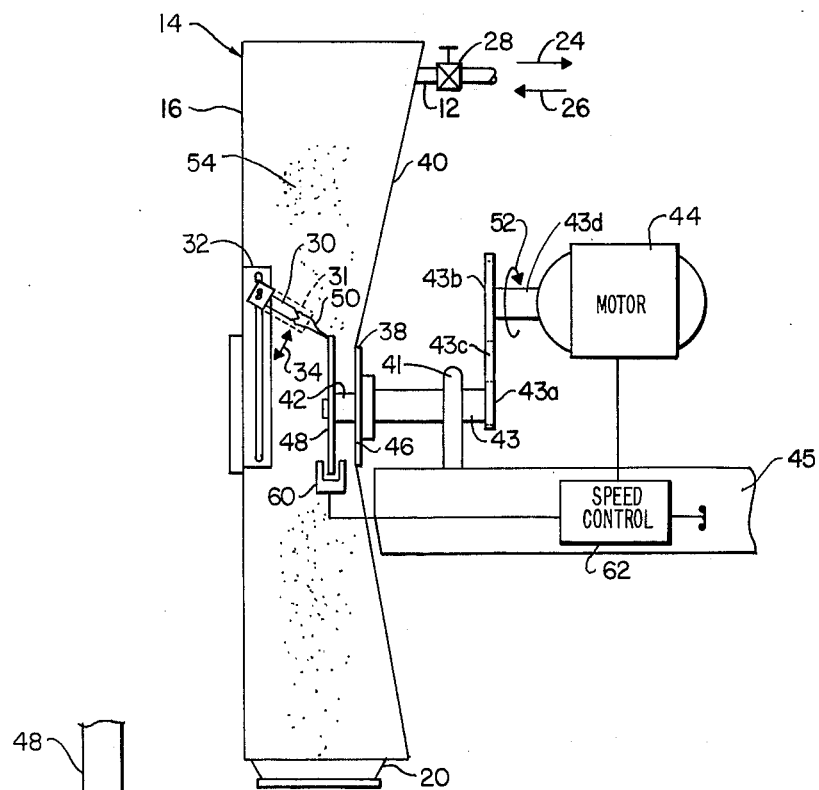
FIG. 2 is a side diagrammatic sectional view of the rotary electrode apparatus according to this invention.

As shown in FIG. 2, the interior of chamber 14 is provided with a controlled atmosphere via manifold 12. Initially the chamber is vacuum evacuated, as indicated by arrow 24, by an unpictured external vacuum pump. Inert gas such as helium is then injected, as indicated by arrow 26, such that a low positive pressure is provided. A valve 28 regulates helium flow into chamber 14, thereby enabling maintenance of chamber pressure within a desired range, e.g. 0.5–5 psig.

An electrode 30, surrounded by a nozzle 31 has an obscured port proximate the tip of the electrode 30. This assembly comprising a D.C. transferred arc plasma torch is adjustably attached, as is shown more clearly in FIG. 4, to a mounting bracket 32, which is in turn mounted to the inside of door 16. Electrode 30 can be adjusted up and down along bracket 32 and angularly as indicated by double headed arrow 34. Such adjustment will be described more fully in connection with FIG. 4.

Through indented central portion 38 of rear chamber wall 40 extends a mandrel 42, comprising a narrow (approximately 2½ inch diameter) rod of solid stock fixed to the end of an external shaft 43 mounted in bearing support 41, which is in turn rotatably driven through pulleys 43a, 43b and belt 43c by shaft 43d of motor 44 mounted on a base 45. A seal 46 prevents leakage of the controlled inert atmosphere through the gap between mandrel 42 and wall 40, as known in the prior art. Mounted proximate the end of mandrel 42 and inside chamber 14 is a disc electrode 48 composed of consumable solid metal stock. An arc 50 is struck, as described hereinafter in FIG. 8, between electrode 30 and the circumferential edge of disc electrode 48, thereby causing melting of the portion of electrode 48 struck by the arc 50. Motor 44 rotates mandrel 42 and thus disc electrode 48 as indicated by arrow 52, and the entire circumference of the disc 48 is consequently melted. Electrode 30 is then adjusted translationally and/or angularly downwardly so that arc 50 moves inwardly on disc 48 to enable consumption of successive circumferential edges thereof. The speed of rotation is sufficient to spin off on centrifuge such melted portions from electrode 48 as indicated by particles 54. These particles cool to form metallic spherical powder which drops to the bottom of chamber 14 through funnel 20 and into the receptacle 22, FIG. 1.

Figure 6:
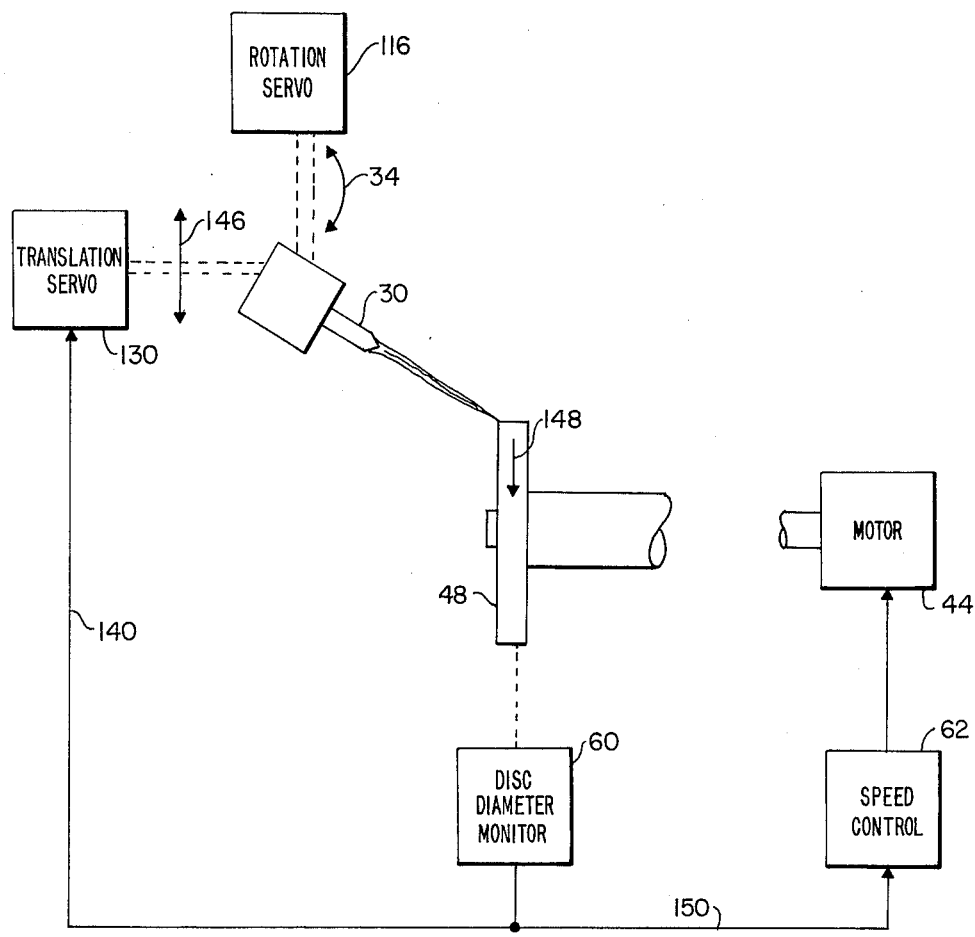
FIG. 6 is a schematic diagram view of the means for varying the speed of rotation of said disc electrode and the means for moving the arc inwardly on the disc electrode.
Figure 7:
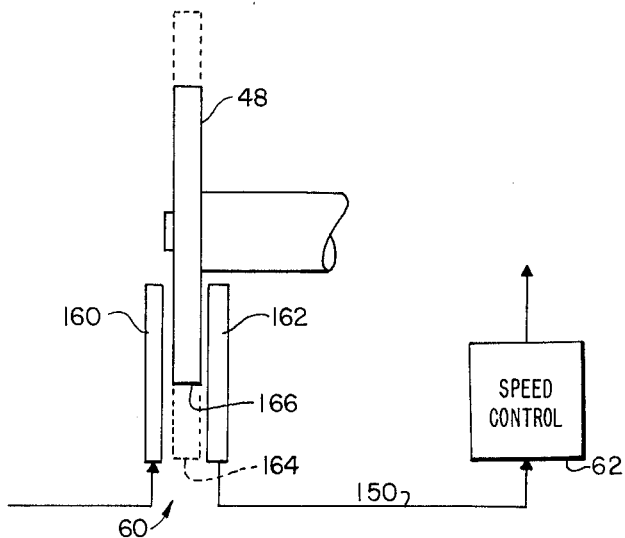
FIG. 7 is a schematic side view of a preferred disc diameter monitor utilized by the means for varying the disc rotation speed.

As each successive circumferential portion is melted a disc diameter monitor 60, described in greater detail in FIGS. 6, 7, senses a reduced disc diameter and relays such information to a speed control 62 which increases the speed of rotation of disc electrode 48 so that melted portion particles 54 are cast off with a uniform centrifugal force.

Figure 3:
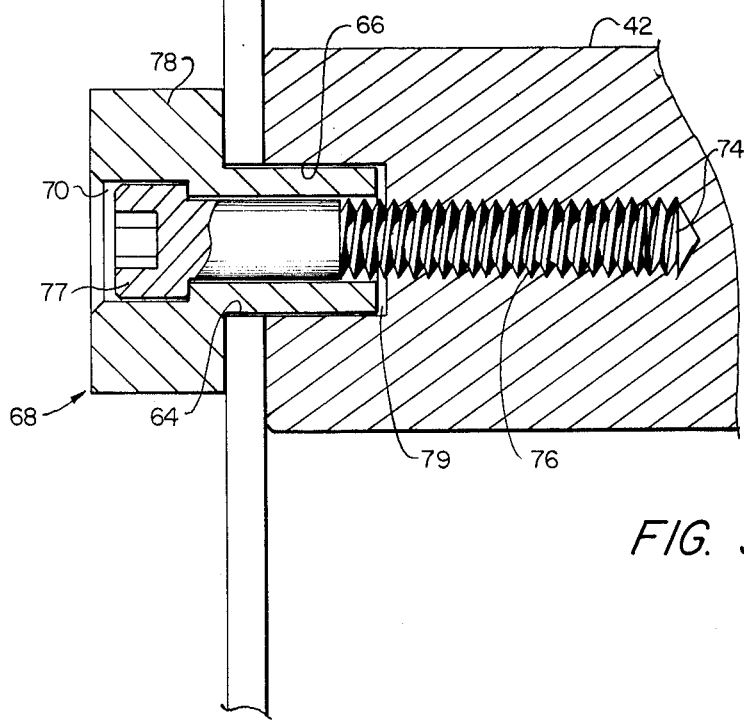
FIG. 3 is a cross-sectional view of a disc electrode of this invention mounted to a rotatable mandrel.

The manner of mounting disc electrode 48 to mandrel 42 is illustrated in FIG. 3. Electrode 48 is provided with an axial hole 64 and is abutted against the inner end of mandrel 42 such that axial hole 64 registers with countersunk mandrel hole 66 which extends axially into mandrel 42 and provides a sliding fit of 0.002–0.004 inch clearance. A disc centering plug 68 having an axial hole 70 is fitted through axial disc hole 64 and into hole 66. A capscrew 74 is inserted through plug hole 70 and is caused to threadably engage the threaded (½-13 UNC) wall of reduced diameter portion 76 of hole 66. Head 77 of screw 74 restricts removal of plug 68, and head 78 of plug 68 retains disc 48 against mandrel 42.

New discs 48 are placed against the face of a 2½ inch mandrel 42. They are correctly located by the disc centering plug 68 and held down by a ½-13 UNC socket head cap screw 74 or similar screw acting on the thread tapped into the mandrel. Disc centering plug 78 is a sliding fit (0.002–0.004 inch clearance) in the mandrel: clearance 79 ensures that the disc is always clamped tight.

Figure 4:
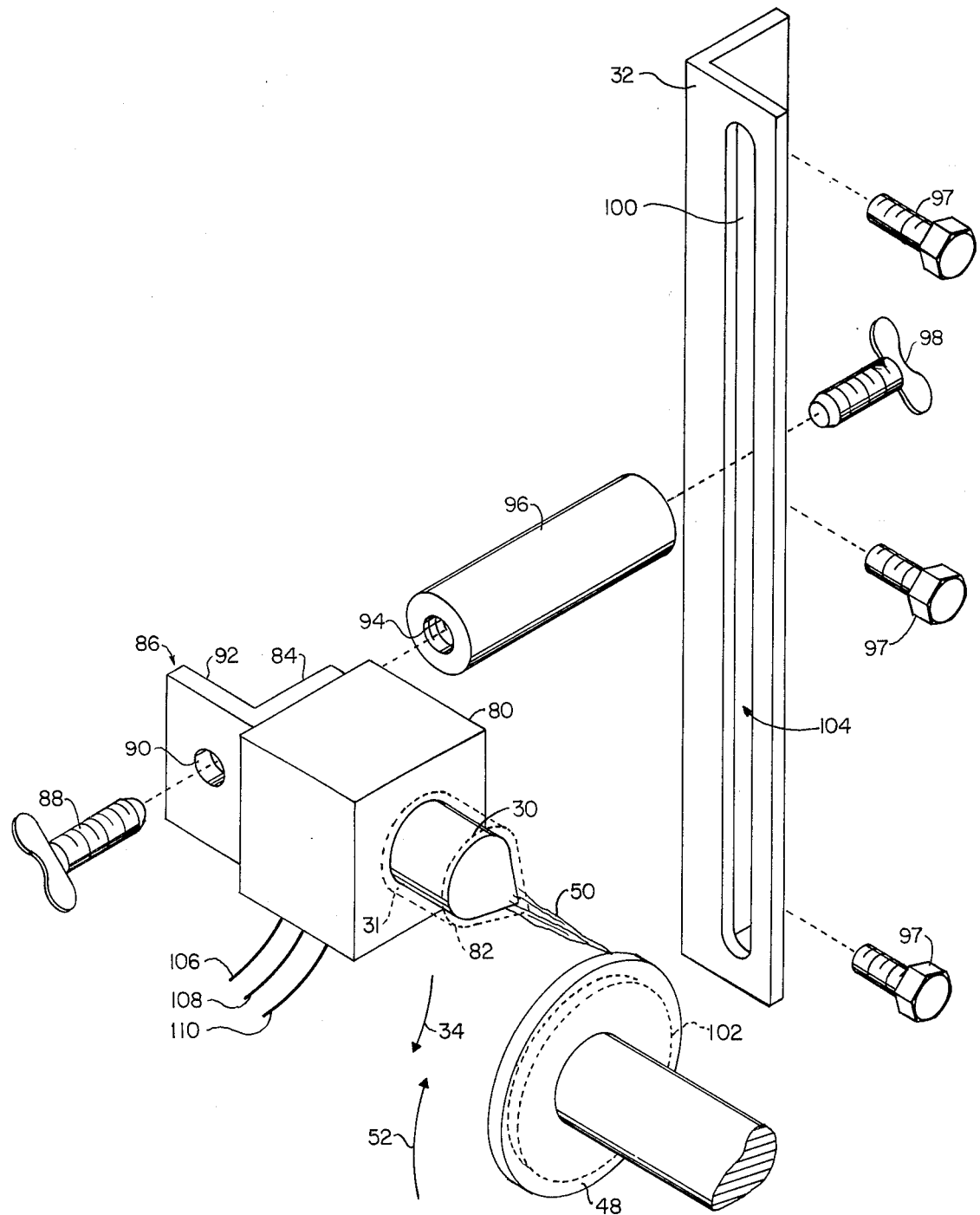
FIG. 4 is an exploded axonometric view of one construction of the means for mounting the first electrode and for moving the arc inwardly on the disc electrode.

As shown in FIG. 4, electrode 30 is adjustable so that the arc may be moved radially inwardly on electrode 48 as successive circumferential portions thereof are consumed. Electrode 30 extends from arc mechanism 80 and is surrounded by nozzle 31, having port 82 at the end thereof. Both electrode and nozzle are retractable within the arc mechanism, which is in turn mounted to arm 84 of an angle bracket 86. A thumb screw 88 is fitted through a hole 90 in arm 92 and is screwed into threaded hole 94 of mounting piece 96. A similar thumb screw 98 is fitted through a slot 100 in mounting bracket 32 and into an obscured threaded hole at the opposite end of piece 96. Bracket 32 is in turn mounted to the inside of chamber door 16 by bolts 97. By loosening screw 98, and moving the screw longitudinally in slot 100, electrode 30 can be adjusted to any point along the length of bracket 32. Its position is then fixed by tightening screw 98. Likewise, the angular disposition of electrode 30 may be altered by loosening screw 88, rotating the electrode 30 up or down, and then retightening the screw 88 to fix the electrode 30 in a desired position.

Such translational and/or rotational adjustment of electrode 30 occurs as disc electrode 48 is consumed by arc 50. In FIG. 4, as disc 48 is rotated in the direction of arrow 52, arc 50 from electrode (cathode) 30 consumes the circumferential portion of disc electrode (anode) 48. The disc diameter is thus reduced as indicated by reduced diameter circumferential portion 102. Arc 50 is moved inwardly on disc 48 so that portion 102 may be melted. Such movement may be performed by loosening screw 98 and lowering electrode mechanism 80 to a position on bracket 32 indicated generally by arrow 104 such that electrode 30 maintains perpendicular confrontation with disc circumferential portion 102. Alternatively, screw 88 may be loosened and electrode 30 rotated downwardly in the direction of arrow 34 so that arc 50 impinges upon circumferential edge 102.

FIG. 4 further discloses electrode wiring 106 entering mechanism 88 and water and helium lines 108, 110, the function of which will be described with FIG. 8.

Figure 5:
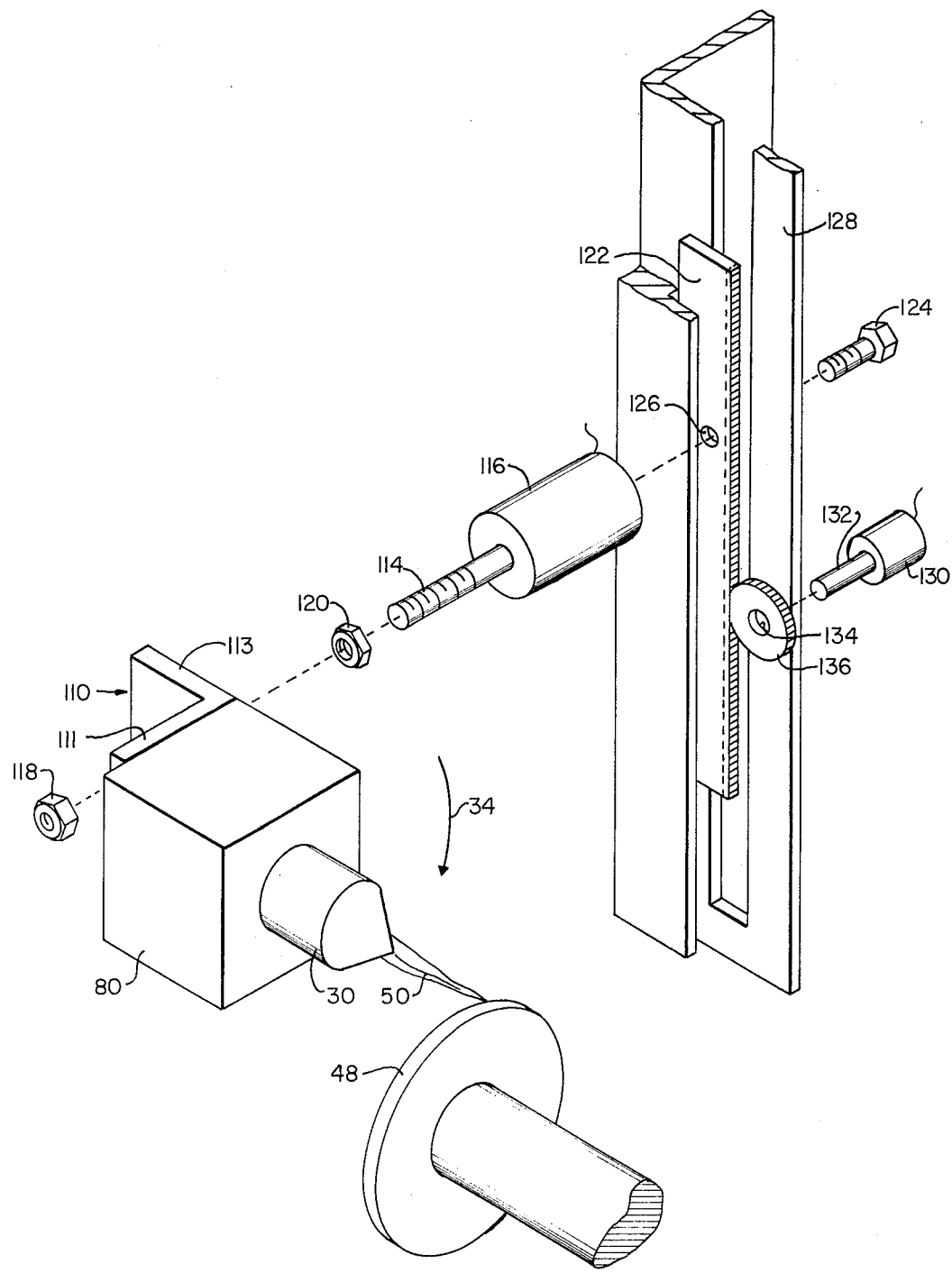
FIG. 5 is an exploded axonometric view of another construction of the means for mounting the first electrode.

Automatic adjustment of the cathode electrode 30 such that the arc moves inwardly on the disc anode 48 is provided as shown in FIG. 5. For clarity, certain details of construction, such as the nozzle, wiring, water and helium lines, are omitted. Arc mechanism 80 is again fixed to one arm 111 of an angle bracket 112. Through an obscured hole in the other bracket arm 113 extends a threaded shaft 114 of a rotational servomechanism 116. Nuts 118, 120 are fitted onto shaft 114 on either side of bracket arm 113 and are tightened about the arm to enable arc mechanism 80 and electrode 30 to rotate with shaft 114. Servomechanism 116 is in turn mounted to rack 122 by means of a screw 124 extending through a hole 126 in rack 122 and threadably secured to an obscured hole in rotational servo 116. Rack 122 is fitted for longitudinal travel within a slotted receptacle 128. By rotation of shaft 114 servo 116 adjusts the angular disposition of electrode 30 in the direction of arrow 34 so that arc 50 moves inwardly on disc 48 as each successive circumferential portion thereof is melted.

Similarly, automatic translational (up and down) movement of electrode 30, and thus arc 50, is possible. A translational servomechanism 130 includes a shaft 132 which extends through the axial hole 134 of a pinion 136 which in turn meshes with rack 122. Counterclockwise rotation of shaft 132 causes downward movement of rack 122 and thus similar downward movement of electrode 30 carried thereby. Clockwise rotation of servo-shaft 132 results in upward movement of the electrode 30. Thus the arc 50 may be moved automatically inwardly on disc 48 in a translational manner.

As shown in FIG. 6, servomechanisms 116, 130 respond to the measurements provided by disc diameter monitor 60. Monitor 60 indicates a progressively reduced diameter disc and servomechanisms 116, 130 connected to monitor 60 via line 140 respond to adjust the position of electrode 30 rotationally, arrow 34, and/or translationally, arrow 146, so as to move arc 50 inwardly as shown by arrow 148 on decreasing diameter electrode 48.

Monitor 60 is likewise connected to speed control 62 via line 150. Diameter measurements are thus also provided to speed control 62 which is programmed to vary the speed at which motor 44 rotates disc electrode 48 inversely with the diameter of the disc 48, i.e., as the disc diameter is reduced the rotational speed is increased. In this manner a constant circumferential or tangential velocity is maintained for all diameters of disc electrode 48. Constant centrifugal force and thus metal spheres of uniform size and quality are consequently provided.

A preferred disc monitor 60, FIG. 7, includes a monotonic photoelectric device comprising a radiation source 160 and sensor 162 disposed on opposite sides of disc 48. As the circumference of disc 48 is melted and thus the diameter thereof is reduced for example from 164 to 166, the light from element 160 which strikes element 162 advances. The signal sent through line 150 to the speed control 62 and similarly to the unpictured servomechanisms reflects this and these control mechanisms respond to adjust the devices they control; i.e., speed control 62 increases the rotational speed of disc electrode 48 and the servomechanisms adjust the cathode electrode to move the arc inwardly on the disc electrode.

Figure 8:
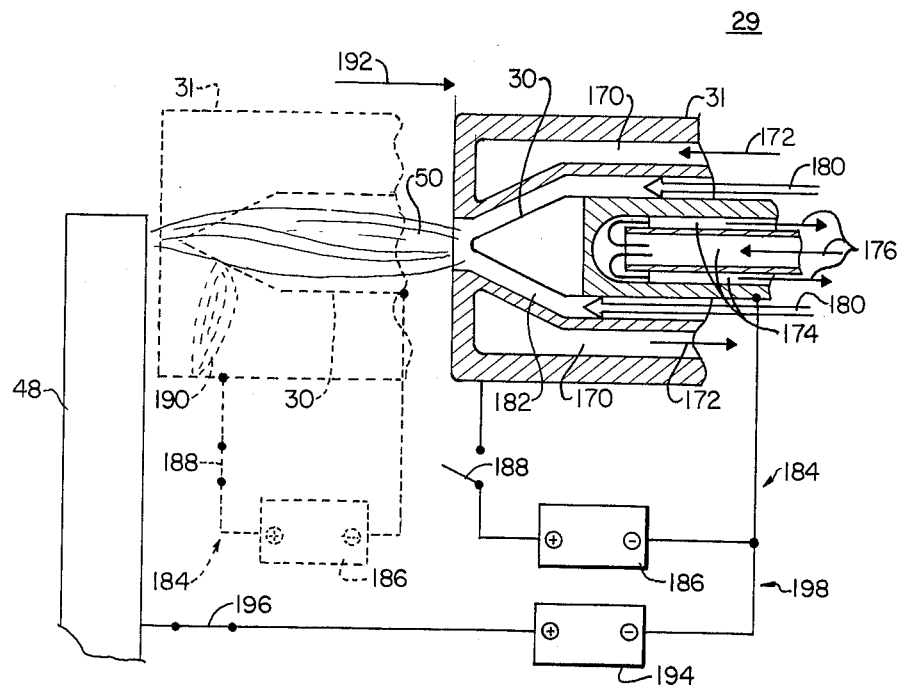
FIG. 8 is a diagrammatic side view, partly in cross-section, of a means for striking an arc used in this invention where a transferred arc plasma torch is employed for melting.

An arc 50 is struck by a plasma gun 29, as shown in FIG. 8. Nozzle 31 includes channels 170 through which cooling water from line 108, FIG. 4, is circulated as indicated by arrows 172. Electrode 30 includes similar channels 174 through which cooling water, arrows 176, is passed. Helium from line 110, FIG. 4, is provided as shown by arrows 180, FIG. 8, through the space 182 between nozzle 31 and electrode 30.

Initially, tungsten electrode (cathode) 30 and copper nozzle 31 are positioned, as indicated by the phantom figure, proximate disc electrode 48. The details of construction of nozzle 31 and electrode 30 in such position are omitted for clarity. An ignition arc circuit 184 including a power supply 186 is completed by closing switch 188 and a non-transfer ignition arc 190 is thereby struck between electrode 30 and nozzle 31 when a brief high frequency electrical discharge is caused to spark between electrode 36 and nozzle 31. The high frequency discharge is necessary initially to provide a certain amount of ionization in the helium flow. Because of the intense ionization of the ignition arc 190 and the proximity to disc electrode 48, a transferred arc 50 is struck between electrode 30 and disc electrode 48. Switch 188 is immediately opened and electrode 30 and nozzle 31 retract, as shown by arrow 192, two to three inches from disc electrode 48. The transferred arc 50 generated by power supply 194 continues to burn. Note that switch 196 in the transferred arc circuit 198 remains closed. Consumption of the disc electrode 48 proceeds in the manner previously described. When melting of the subject disc is completed, switch 196 is opened and the arc 50 is turned off.

Figure 9:
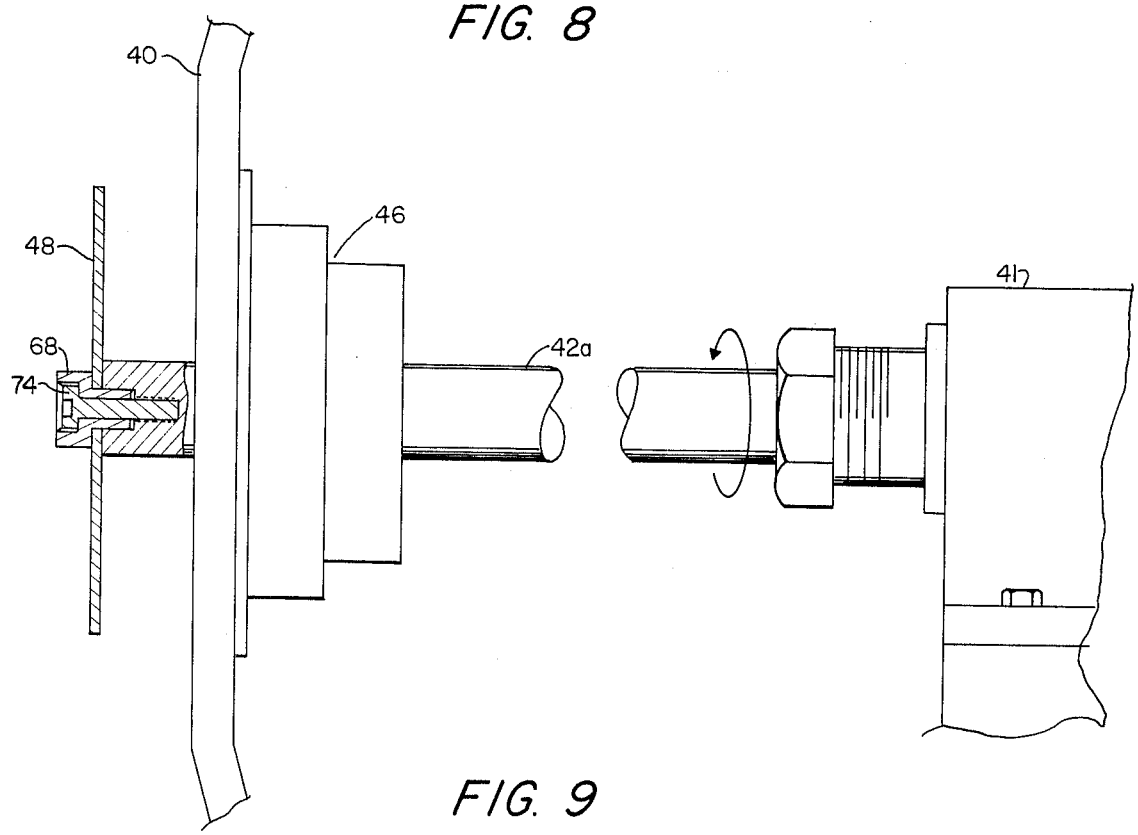
FIG. 9 is a view partially in cross section of a disc electrode of this invention mounted by an alternative construction to a rotatable mandrel.

In a preferred construction, FIG. 9, disc 48 is mounted to mandrel 42a, which is driven by a precision spindle 41 rather than a bearing support and motor. Capscrew 74 fastens plug 68 and disc 48 to mandrel 42a, which passes through seal bearing 46. The preferred manual control mechanism for a plasma gun 29a, FIG. 10, includes a ball and socket joint and seal 220, mounted to door 16a and including a housing 222 holding spherical socket 224 which receives a ball 226. An "O" ring 228 in socket 224 seals against ball 226 and a similar "O" ring 230 in bore 232 of ball 226 seals against plasma gun 29a to allow rotation in the vertical plane, arrows 234, and translation, arrows 236, of plasma gun 29a.

Other embodiments will occur to those skilled in the art and are within the following claims:

What is claimed is:

1. A rotary disc electrode apparatus for producing metal powders, comprising:
   a chamber for maintaining a controlled atmosphere therein;
   first means for mounting a first electrode in said chamber;
   a rotatable shaft mounted in said chamber;
   second means attachable to said shaft for securing a second electrode in the form of a consumable disc having hole means to receive one of the group of said shaft and said second means to secure said second electrode in said chamber proximate the end of said shaft confronting said first electrode said consumable disc electrode having a larger diameter than said shaft;
   means for striking an electric arc between said first electrode and a circumferential portion of said disc electrode in order to melt said circumferential portion; and
   means for rotating said disc electrode at sufficient speed to enable casting off of melted circumferential portions therefrom.

2. The rotary electrode apparatus of claim 1 in which said first means for mounting includes means for moving said arc inwardly on said disc electrode as successive circumferential portions of said disc electrode are consumed.

3. The rotary electrode apparatus of claim 1 in which said means for rotating includes means for varying the speed of rotation of said disc electrode inversely with respect to the diameter thereof.

4. The rotary electrode apparatus of claim 2 in which said means for moving includes means for varying the angle of said first electrode relative to said consumable disc electrode.

5. The rotary electrode apparatus of claim 1 wherein said second means for mounting includes a rotatable mandrel and means for attaching a consumable disc electrode to said mandrel.

6. The rotary electrode apparatus of claim 1 in which said means for rotating includes a motor for rotating said consumable disc electrode.

7. The rotary apparatus of claim 3 in which said means for rotating includes a motor for rotating said consumable disc electrode and wherein said means for varying the speed includes means for controlling the speed of said motor.

8. A rotary disc electrode apparatus for producing metal powders, comprising:
   a chamber for maintaining a controlled atmosphere therein;
   first means for mounting a first electrode in said chamber;
   second means for mounting a second electrode in the form of a consumable disc in said chamber confronting said first electrode;
   means for striking an electric arc between said first electrode and a circumferential portion of said second electrode in order to melt said circumferential portion;
   means for rotating said second electrode at sufficient speed to enable casting off of melted circumferential portions therefrom;
   said first means for mounting including means for varying the angle of said first electrode relative to said second electrode to move said arc inwardly on said second electrode as successive circumferential portions of said second electrode are consumed.

* * * * *